(12) United States Patent
Li et al.

(10) Patent No.: US 11,278,134 B2
(45) Date of Patent: Mar. 22, 2022

(54) CUSTOM PILLOWS, SYSTEM AND PROCESS OF DETERMINING OPTIMUM PILLOW CHARACTERISTICS

(71) Applicant: PLUTO BRAND, INC., City of Industry, CA (US)

(72) Inventors: Kevin Li, Diamond Bar, CA (US); Susana Saeliu, La Habra Heights, CA (US)

(73) Assignee: Pluto Brand, Inc., City of Industry, CA (US)

( * ) Notice: Subject to any disclaimer, the term of this patent is extended or adjusted under 35 U.S.C. 154(b) by 124 days.

(21) Appl. No.: 16/368,615

(22) Filed: Mar. 28, 2019

(65) Prior Publication Data

US 2019/0298088 A1    Oct. 3, 2019

Related U.S. Application Data (60) Provisional application No. 62/650,910, filed on Mar. 30, 2018.

(51) Int. Cl.
| | |
|---|---|
| *G06Q 30/00* | (2012.01) |
| *A47G 9/10* | (2006.01) |
| *A47G 9/02* | (2006.01) |
| *G06Q 30/06* | (2012.01) |

(52) U.S. Cl.
CPC ............ *A47G 9/10* (2013.01); *A47G 9/0253* (2013.01); *G06Q 30/0631* (2013.01); *A47G 2009/1018* (2013.01)

(58) Field of Classification Search
CPC .. G06Q 30/0601; G06Q 30/0621; A47G 9/10; A47G 9/0253; A47G 2009/1018

USPC ..................................................... 705/26, 27
See application file for complete search history.

(56) References Cited

U.S. PATENT DOCUMENTS

| | | | | |
|---|---|---|---|---|
| 8,528,138 | B2 * | 9/2013 | Hooper | .................... A47G 9/10 5/636 |
| 2008/0209641 | A1 * | 9/2008 | Boyd | ..................... G06Q 50/10 5/706 |
| 2010/0332009 | A1 * | 12/2010 | Hooper | .................... A47G 9/10 700/103 |
| 2014/0052570 | A1 * | 2/2014 | Roberts | ................ A47C 31/123 705/26.7 |

OTHER PUBLICATIONS

Leesa Sleep Launches Customizable Pillow To Satisfy Multiple Sleep Positions and Preferences, Feb. 28, 2018, PR Newswire. (Year: 2018).*
TailorRest Revolutionizes Sleep; Introduces World's First Customizable Pillow System, May 17, 2016, PR Newswire. (Year: 2016).*
Anonymous, Now Available Online, The Pillow Bar is the Right Mix of Luxury and Necessity, Apr. 7, 2009, PR Newswire (Year: 2009).*
Headleveler, May 3, 2015, http://headleveler.com/order/?pg=wizard (Year: 2015).*
Pluto Pillow Announces Launch of Personalized Pillows for Individualized Comfort M2 Presswire [Coventry] Mar. 6, 2018; Dialog #2010806898 2 pgs. (Year: 2018).*

* cited by examiner

*Primary Examiner* — Robert M Pond
(74) *Attorney, Agent, or Firm* — Lewis Brisbois Bisgaard & Smith LLP; Josephine Brosas, Esq.

(57) ABSTRACT

A system for making a custom pillow using selected ones of several, different, interchangeable components, the selection based on a potential user's answers to questions that identify the user's needs and preferences in regard to pillow characteristics.

15 Claims, 10 Drawing Sheets

A. QUESTIONS ARE PRESENTED TO THE POTENTIAL CUSTOMER/USER, TO WHICH THE POTENTIAL CUSTOMER/USER PROVIDES RESPONSES

(1) Name and age:

(2) Height and weight:

(3) Email:

(4) Is your current pillow: (To know what type of pillow the potential user / customer is currently using.)
   a) Latex?   b) Foam?   c) Fill?   d) Other/Don't Know?

(5) Would you describe as: (To determine how soft or firm is the potential user's / customer's current pillow.)
   a) Soft?   b) Medium?   c) Firm?

(6) What about its height: (To determine how high or low is the potential user's / customer's current pillow.)
   a) Low?   b) Medium?   c) High?

(7) How satisfied are you with it (5 being pretty peachy):
   (To determine how much does the potential user/customer like her/his current pillow?  In other words, should a similar pillow or a completely different pillow be created?)
   1   2   3   4   5

(8) Is your current pillow: (This question appears if the potential user / customer chooses a low number in question 7.)
   a) Too hard?   b) Too soft?   c) Just right?

FIG. 10A (9) Is your current pillow: (This question appears if the potential user / customer chooses a low number in question 7.)

a) Too low?   b) Too high?   c) Just right?

(10) Does your head get hot at night:
   (Yes means that the 350GSM Cooling Circular Knit Filled Pillow Jacket or a similar material is provided / recommended.)

a) Yes?   b) No?

(11) Do you prefer a smooth, simple pillow surface or something more quilted & plush?

a) Smooth?   b) Quilted?   c) No Preference?

(12) What position do you tend to settle in when you go to bed?

a) Facing up (back)?   b) Facing down (stomach)?   c) On your side?

(13) What position do you tend to settle in when you wake up?

a) Facing up (back)?   b) Facing down (stomach)?   c) On your side?

(14) What sounds better? (Would she/he prefer a more traditional plushy feel or a more foam-like supportive feeling in her/his pillow?)

a) Plush and Melt-in   b) Settled in and supportive (15) An optional comment section, such as a blank box
   (Wherein a customer can type in specific comments, such as those that are not covered in the questionnaire, that they would like to be taken into account for their pillow configuration.)

FIG. 10B

B. THE RESPONSES TO QUESTIONS (4) – (14) ARE WEIGHTED AND POINTS ARE ASSIGNED TO THE RESPONSES i. Example 1: If the potential user disliked his/her previous pillow for being too low and it was a low pillow to begin with, all of the preferred medium height pillow configurations would provide a 1 point boost.

ii. Example 2: An answer stating that the user went into bed on the user's side would assign a 2-point boost to medium high pillow configurations because it is believed that initial-getting-into-bed-comfort is very important for a good night's sleep.

iii. Example 3: If a potential user really loved his/her current pillow and chose a "5" in question 7, then more points will be assigned to the configurations best matching the user's current pillow's characteristics.

iv. Example 4: If the answer selected in question 7 was a "1", indicating that the user hated his/her current pillow, then more weight would be assigned to the answers to questions 8 and 9, so that the user would get a pillow that is new and different from his/her current pillow.

v. Example 5: A user who answers "plush and melt-in" in question 14 would likely receive a pillow that has a thick 3D cover with a smaller, relatively thin, such as a 2" foam.

vi. Example 6: A user who answers "Settled in and supportive" in question 14 would likely receive a thinner 1.5D cover and a relatively thick, such as a 3" foam.

vii. Example 7: The pillows in the middle of the pack are provided with more opportunities to earn points than pillows with extreme configurations, given that extreme ends of the spectrum are not selected as often, such that only those potential users who answer in an extreme way will get a very low or very high pillow. Nonetheless, the system is "fail-safe" such that extreme responses that do not make sense still produce a configuration that is not very extreme, one way or another.

FIG. 10C

C. BASED ON THE POINTS ASSIGNED TO THE RESPONSES, CALCULATIONS ARE PERFORMED, SUCH AS IN JAVASCRIPT

D. THE FINAL, RECOMMENDED PILLOW CONFIGURATION IS PROVIDED BY THE WEBSITE (OR APP) AFTER THE QUESTIONNAIRE IS COMPLETED

E. ALL RESPONSES AND ANSWERS TO THE QUESTIONNAIRE, WHEN AN ORDER FOR A PILLOW IS RECEIVED, ARE STORED ELECTRONICALLY

F. WHEN AN ORDER FOR A PILLOW IS RECEIVED, ANY COMMENTS IN THE COMMENT SECTION (15) ARE CONSIDERED IN PRODUCING THE PILLOW

CUSTOM PILLOWS, SYSTEM AND PROCESS OF DETERMINING OPTIMUM PILLOW CHARACTERISTICS

CROSS-REFERENCE TO RELATED APPLICATION

This application claims the benefit of U.S. provisional application No. 62/650,910, filed on Mar. 30, 2018 and entitled "CUSTOM PILLOWS, SYSTEM AND PROCESS OF DETERMINING OPTIMUM PILLOW CHARACTERISTICS." The contents of the above application are hereby incorporated by reference herein.

FIELD OF INVENTION

The invention relates generally to pillows, to a process for determining which characteristics, of many pillow characteristics, correspond to or meet the needs of an individual user, and to build an improved or custom pillow based on the stated needs or preferences of an individual user.

BACKGROUND

Buying a pillow is not a straightforward experience for most consumers. Much like buying pants online, buying pillows online is risky, because the consumer is not able to feel and try out the pillow prior to purchasing a pillow. When shopping for a pillow in a store, going to a store to see the pillows is potentially more confusing and risky because of the great, seemingly overwhelming number of choices of characteristics and properties available for pillows. For example, many well known suppliers, such as Bed Bath and Beyond, have literally hundreds of pillows with different characteristics and/or properties. Additionally, the customer typically is allowed to try out a store pillow only by hand touching and handling the pillows on display. Even if a customer is permitted to try out one or more pillows by putting his/her head on the pillow(s), such as for example, 15 pillows, such a try out is not reasonably comparable to a try out under normal sleeping conditions, that is, when sleeping on the pillow(s) for 5-8 hours. As a consequence of the lack of opportunity to realistically try out pillows, many people end up with pillows that are not fully responsive to their needs and preferences. There is also a need for customizing, or optimizing support and comfort that a pillow provides, based on the needs or preferences of an individual consumer. These needs or preferences are not addressed through in-store try outs or purchases, where a customer is only presented with pillows with pre-set characteristics and/or properties.

SUMMARY OF INVENTION

The custom pillow and process of determining optimum pillow characteristics for a specific use according to the present disclosure overcomes the drawbacks and problems of known pillow and processes of selecting pillows by providing an algorithm for determining optimum pillow characteristics for a particular user, variety of pillow components that are mixed and matched in accordance with the algorithm to provide a resulting pillow configuration having characteristics best matched to the needs and preferences of the particular user.

It is to be understood that the embodiments described herein are not limited to the details of construction, processes, or to the arrangements of the components set forth in the above summary and below description, or as illustrated in the drawings. Rather, the invention may be practiced in numerous forms and embodiments. Also, it is to be understood that the phraseology and terminology employed herein are for the purpose of the description and should not be regarded as limiting.

Embodiments, examples, features, aspects, and advantages of the present disclosure will become better understood with regard to the following description, appended claims and accompanying drawings.

BRIEF DESCRIPTION OF THE DRAWINGS

The foregoing aspects and the attendant aspects of the present disclosure will become more readily appreciated by reference to the following detailed description, when taken in conjunction with the accompanying drawings, wherein:

FIGS. 10, 10A-10D is a diagram which includes the algorithm comprising a series of questions wherein the responses are assigned a given weight or score for optimizing pillow characteristic for a particular user; and, FIG. 11 is a flow-chart showing an exemplary embodiment of a step-by-step process incorporating the algorithm of FIG. 10 in customizing the pillow depicted in FIG. 1.

Reference symbols or names are used in the Figures to indicate certain components, aspects or features shown therein. Reference symbols common to more than one Figure indicate like components, aspects or features shown therein.

DETAILED DESCRIPTION OF INVENTION

Various aspects of specific embodiments are disclosed in the following description and related drawings. Alternate embodiments may be devised without departing from the spirit or the scope of the present disclosure. Additionally, well-known elements of exemplary embodiments will not be described in detail or will be omitted so as not to obscure relevant details. Further, to facilitate an understanding of the description, a discussion of several terms used herein follows.

The word "exemplary" is used herein to mean "serving as an example, instance or illustration." Any embodiment described herein as "exemplary" is not necessarily to be construed as preferred or advantageous over other embodiments. Any embodiment described herein as "preferred" is not necessarily to be construed as limiting, or as limited only to the specifically described embodiment. Likewise, the term "embodiments" or "configuration" is not exhaustive and does not require that all embodiments or configurations include the discussed feature, advantage or mode of operation.

The detailed description set forth below is intended as a description of presently-preferred embodiments of the invention and is not intended to represent the only forms in which the present invention may be constructed and/or utilized. However, it is to be understood that the same or equivalent functions and results may be accomplished by different embodiments that are also intended to be encompassed within the spirit and scope of the invention, and additional variations of the present invention may be devised without departing from the inventive concept. The description itself is not intended to limit the scope of any patent issuing from this description. Rather, the inventors have contemplated that the claimed subject matter might also be embodied in other ways, to include different elements or combinations of elements similar to the ones described in this document, in conjunction with other present or future technologies.

Figure 1:
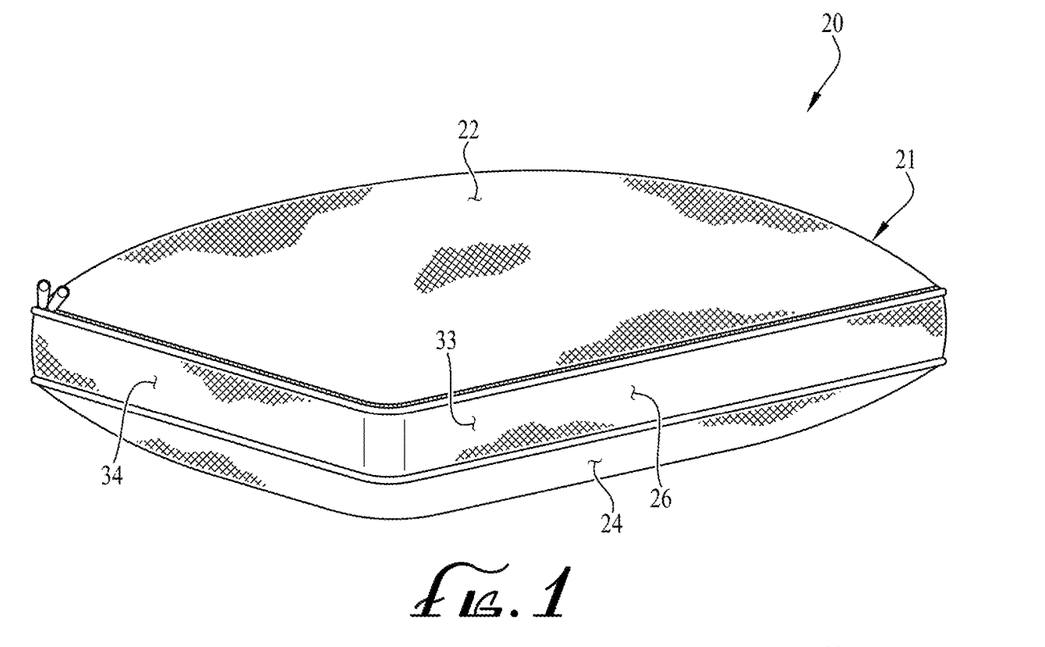
FIG. 1 is a perspective, external view of a preferred embodiment pillow.
Figure 2:
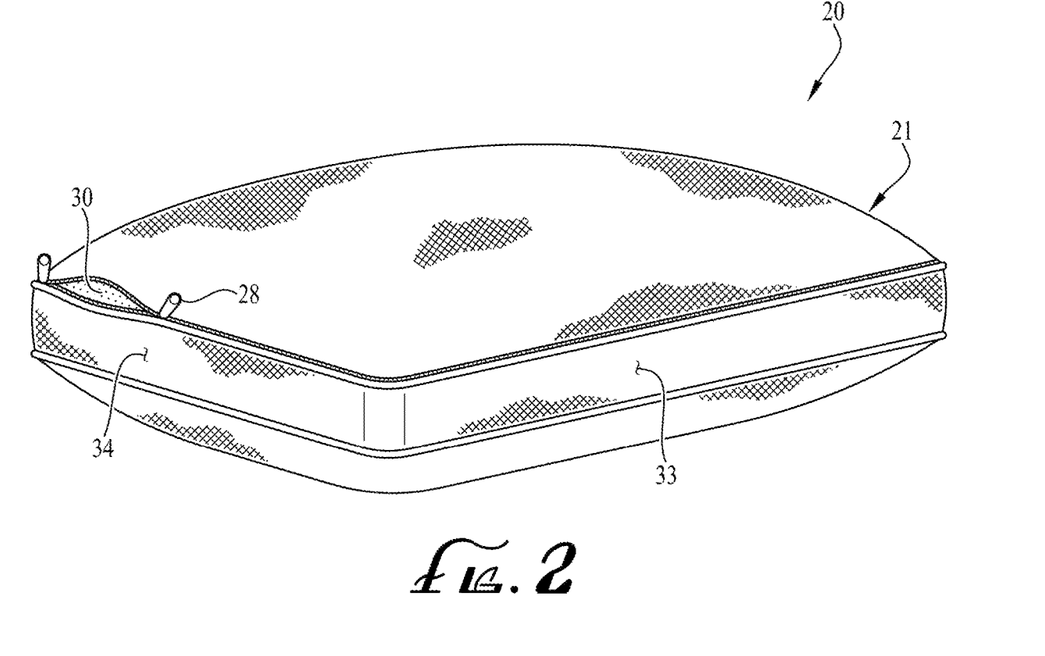
FIG. 2 is a perspective, external view of the FIG. 1 embodiment with the zippered cover shown as it is beginning to be unzipped.

With reference to FIGS. 1-11 preferred embodiments of the present invention will described herein. FIG. 1 shows a preferred embodiment pillow 20, having a cover 21 that includes an outer, preferably plush top cover 22, an outer, preferably plush bottom cover 24 and a gusset or side wall 26. Gusset 26 is positioned between the top and bottom covers, extends around the periphery of the pillow and has a predetermined height. Pillow 20 also includes a zipper 28, although a zipper is not required, and other types of fastening mechanisms, such as Velcro® and/or buttons may be used. As shown in FIG. 2, zipper 28 is partially unzipped, exposing part of internal foam core 30. Pillow 20 is preferably in the shape and size of a conventional, generally rectangular pillow, with long side or edge or long gusset 33, and short side or edge or short gusset 34.

Figure 3:
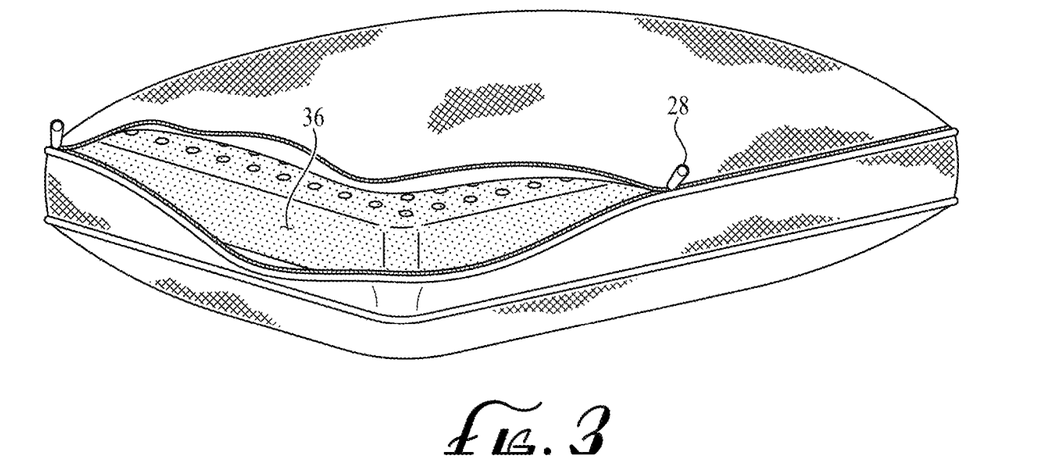
FIG. 3 is a perspective, external view of the FIG. 1 embodiment with the zippered cover unzipped over the short side and unzipped over about one-half of the length of the long side of the pillow.
Figure 4:
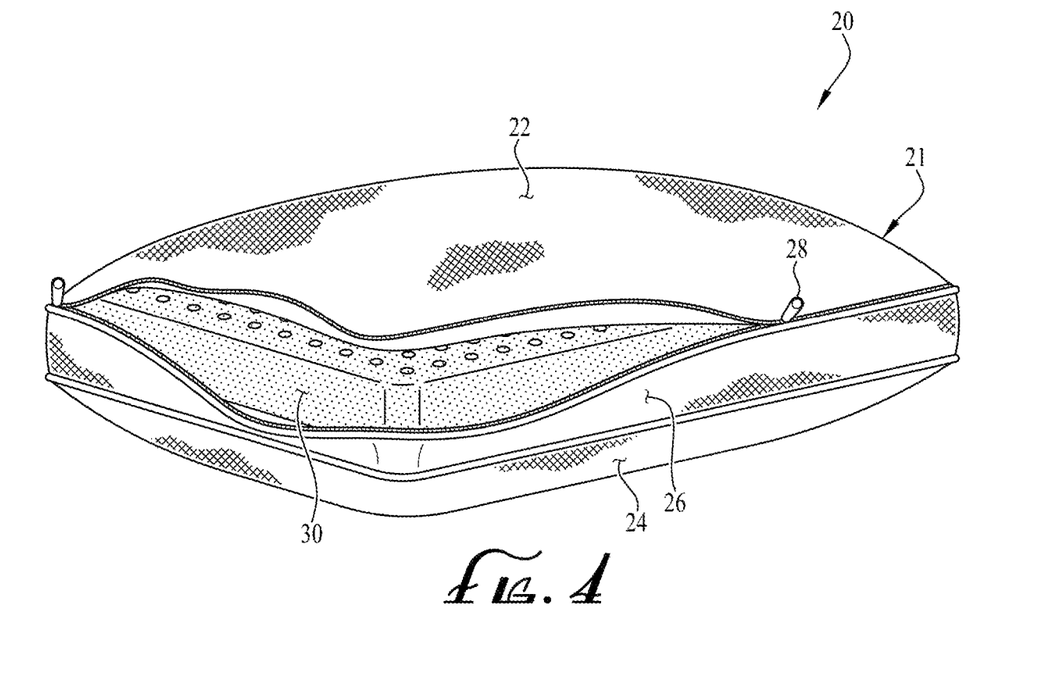
FIG. 4 is a perspective, external view of the FIG. 1 embodiment with the zippered cover unzipped over the short side, unzipped over most of the length of the long side of the pillow and showing a internal foam component of the pillow.

Referring to FIGS. 3 and 4, zipper 28 is shown further unzipped along the periphery of pillow cover 21, with one end of one short side of the pillow top cover 22 fully open and approximately one-half of one long side of the pillow top cover 22 open or unzipped. Foam insert 30 is shown as a component positioned inside of the pillow, between covers top cover 22, and bottom cover 24 and surrounded by gusset or side walls 26. The preferred foam insert is made of polyurethane, although other foams may be used so long as they perform their intended function(s). The preferred foam is commercially available from suppliers/manufacturers such as Carpenter Co., and from Elite Comfort Solutions. The foams are preferably made without ozone depleters, PBDEs, TDCPP, or TCEP flame retardants, mercury, lead or other heavy metals, formaldehyde, and phthalates regulated by the Consumer Product Safety Commission, and are preferably CertiPUR certified, as described at http://certipur.us/about-the-seal/, Mar. 15, 2018.

Figure 5:
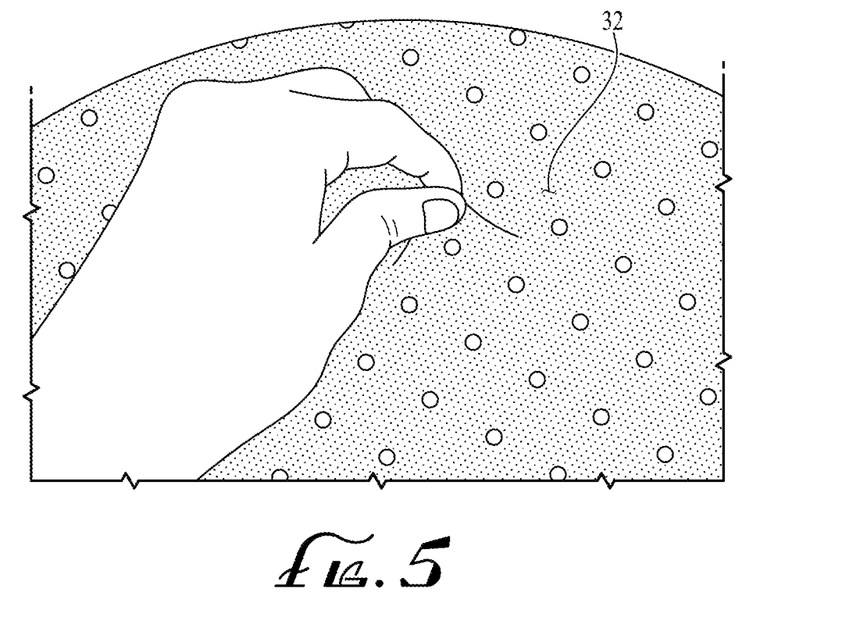
FIG. 5 is a perspective view of the FIG. 1 pillow, with a cut-away area showing an area of the internal foam component and a mesh cover over the foam component.
Figure 6:
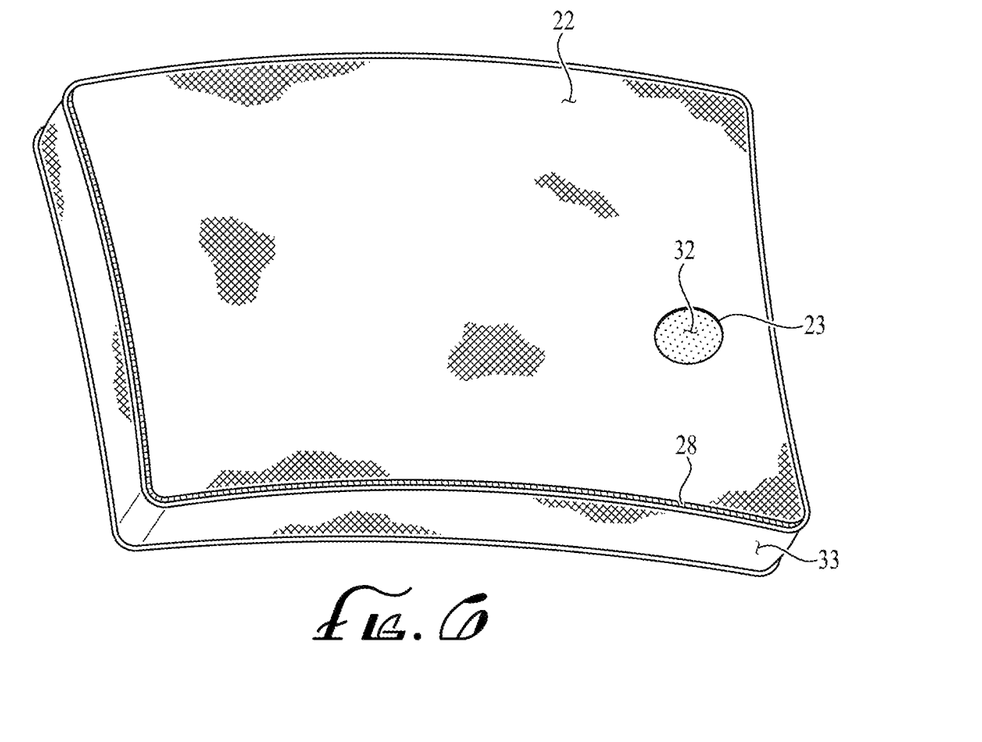
FIG. 6 is a top view of the FIG. 1 pillow with a small area of the top cover removed to show filling material positioned inside of the top cover.

Referring to FIGS. 5 and 6, a thin, flexible, stretchable mesh 32 is shown covering foam insert 30, shown in FIG. 4. FIG. 5 shows the mesh 32 being stretched, and FIG. 6, a top view of pillow 20, with a small, oval cut out portion 23 of top cover 22 shows a corresponding portion of mesh 32 exposed.

Figure 7:
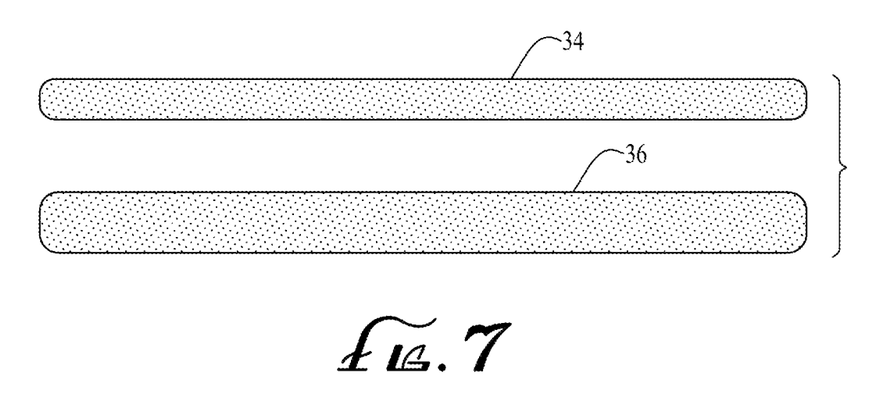
FIG. 7 is a side view showing two preferred embodiments of the internal foam components that may be used in the FIG. 1 embodiment pillow.

Referring to FIG. 7, two sizes of preferred embodiments of foam insert 30 are shown as relatively thin foam insert 34, such as a 2-inch high foam, and relatively thick foam insert 36, such as a 3-inch high foam. The preferred foams may be of varying heights/thickness, and also have several configurations, with each configuration adapted to correspond to several types of users or several user preferences.

For example, one preferred foam core is available from Carpenter Co., as its "Serene" foam. This foam is a 2.5 pound density, open-cell, high resilience, high-performance poly-foam. This foam is referred to as "premium" foam, and has a relatively soft feel. These preferred foam configurations are:

1.1. A 2-inch high Serene foam. Dimensions: 23×15×2"
1.2. A 3-inch high Serene foam. Dimensions: 23×15×3"
1.3. A 2.5-inch high Serene foam. Dimensions: 23×15×2.5"
1.4. A 3.5-inch high Serene foam. Dimensions: 23×15×3.5".

A second preferred foam is known as Springtex foam, available from Elite Comfort Solutions. This foam is fine open-cell foam, specially made to emulate some of the properties people like about latex. Springtex foam bounces back quickly and also minimizes heat retention much like latex. Springtex foam also works for users who may like the properties of latex but who are allergic to latex. This foam is preferred for the pillow inserts as:

1.1. A 2-inch high Springtex foam. Dimensions: 23×15×2 inches
1.2. A 3-inch high Springtex foam. Dimensions: 23×15×3 inches.
1.3. A 2.5-inch high Springtex foam. Dimensions: 23×15×2.5 inches
1.4. A 3.5-inch high Springtex foam. Dimensions: 23×15×3.5 inches.

A third preferred foam is sold as Visco foam, and is available from Elite Comfort Solutions. Visco foam is a very high density (4 lbs) open-cell foam that is also a highly supportive foam, with the slowest bounce back. Visco foams are for users who want to have a very supportive pillow, and typical used in the following sizes:

1.1. A 2-inch high Visco foam. Dimensions: 23×15×2"
1.2. A 3-inch high Visco foam. Dimensions: 23×15×3"
1.3. A 2.5-inch high Visco foam. Dimensions: 23×15×2.5"
1.4. A 3.5-inch high Visco foam. Dimensions: 23×15×3.5".

Figure 8:
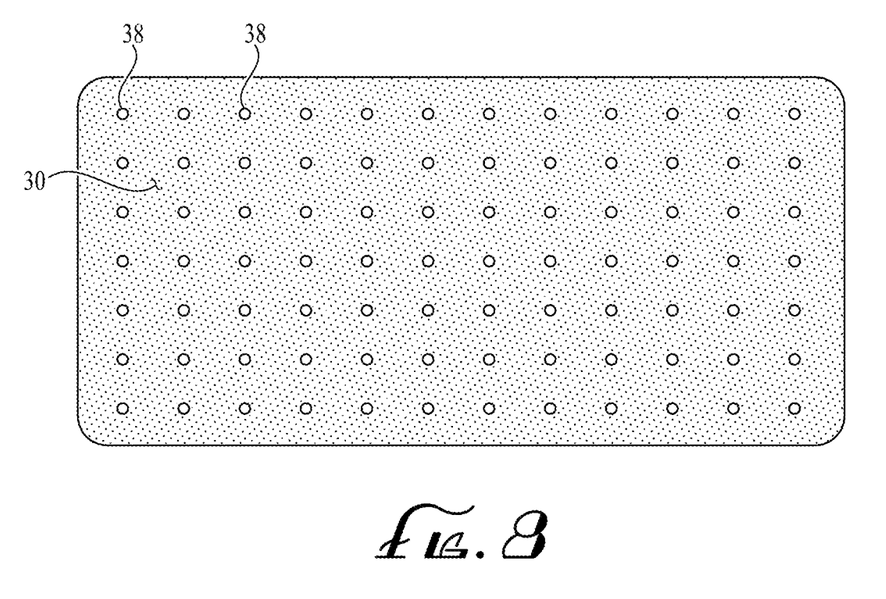
FIG. 8 is a top view of a preferred internal foam component of the FIG. 1 embodiment showing holes positioned in the foam to promote air flow and provide a relatively lighter feel to the pillow as compared to a pillow with a foam component that has no air hole.

Referring to FIG. 8, foam insert 30 is shown with a plurality of holes, one of which is shown at 38. Holes 38 function to provide improved air flow through the pillow (as compared to foam without such holes), to provide heat removal during use and to reduce the weight of the pillow. In the preferred embodiment of FIG. 8, holes 38 are arranged in a column and row configuration. However, alternate configurations and various hole shapes and sizes may be used so long as they perform their intended function(s).

Figure 9:
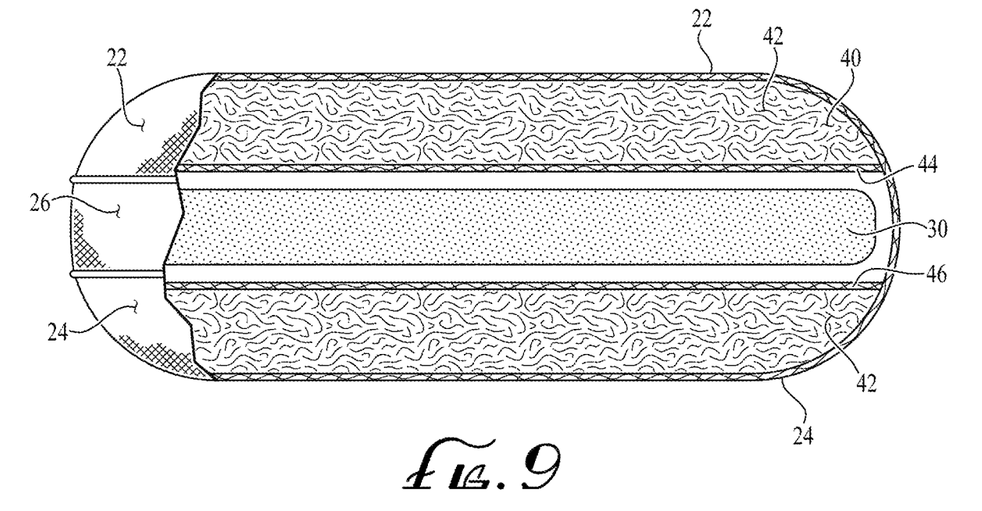
FIG. 9 is a partial cross-sectional view of the FIG. 1 pillow, showing the internal foam component and the filling material positioned inside of the top cover and inside of the bottom cover of the pillow.
Figure 10:
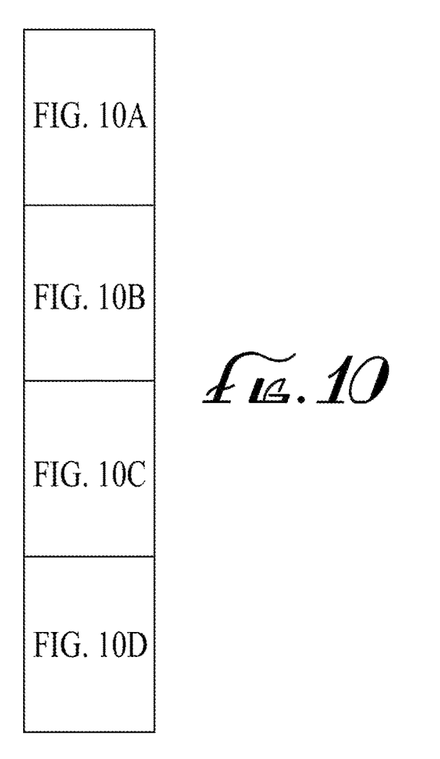
Figure 10A:
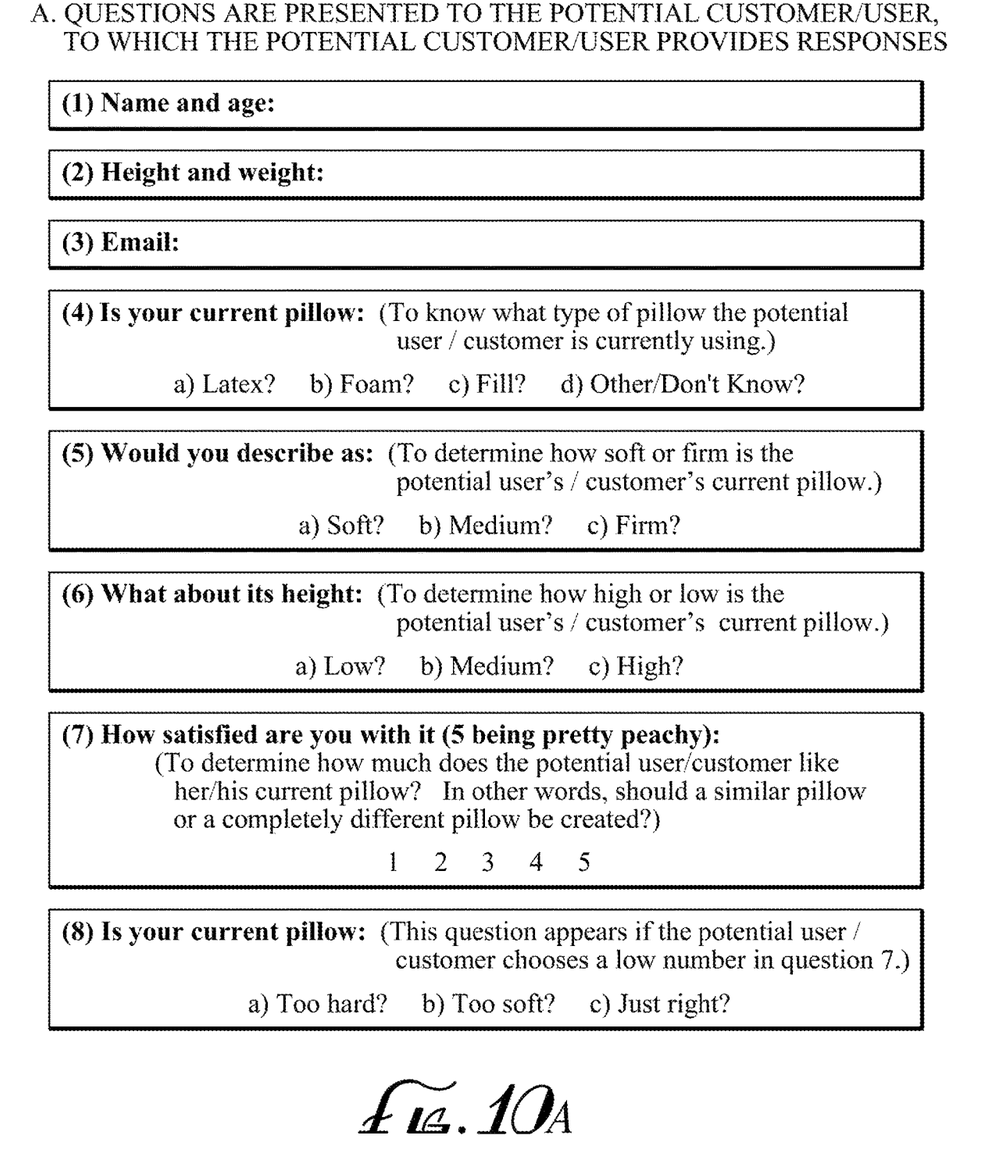
Figure 10B:
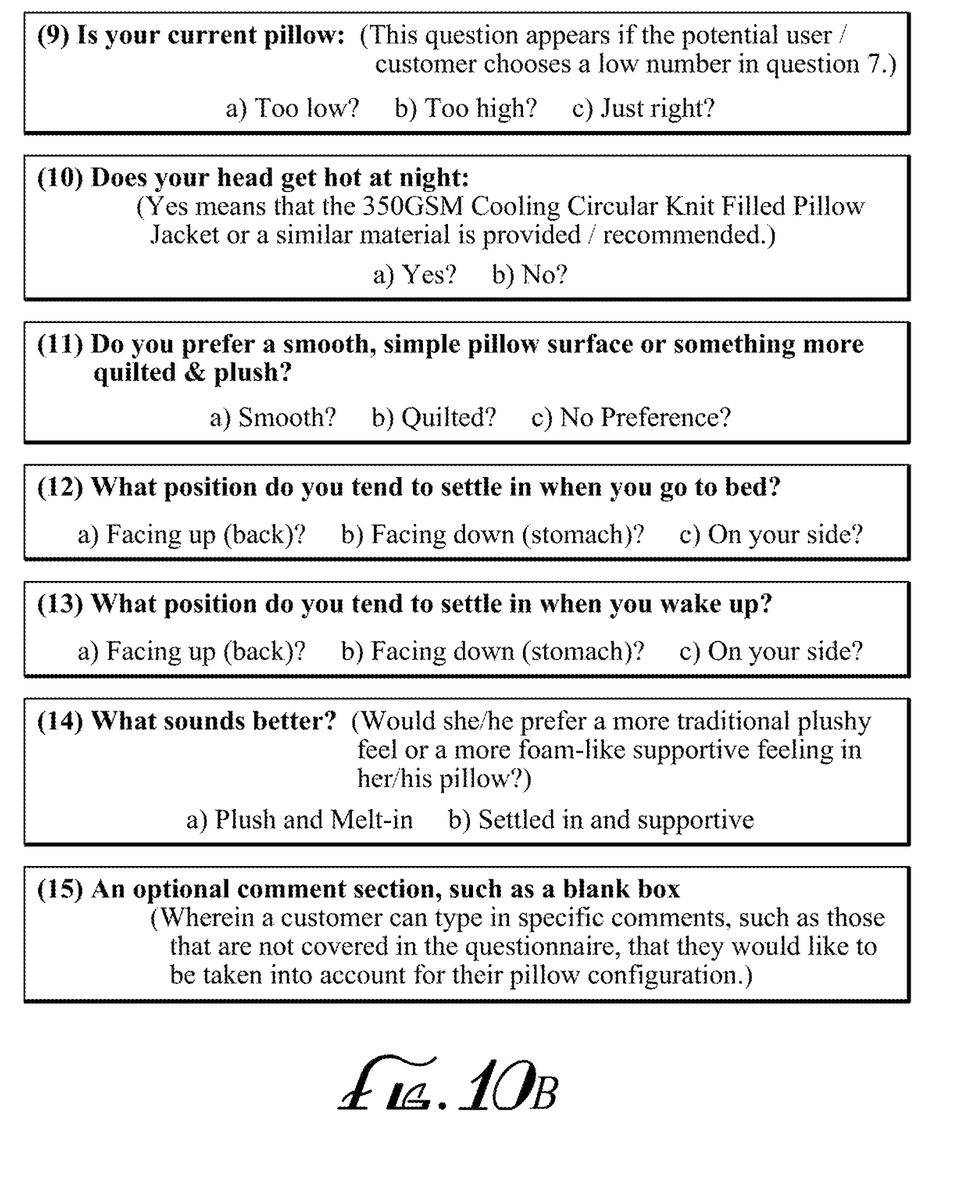
Figure 10D:
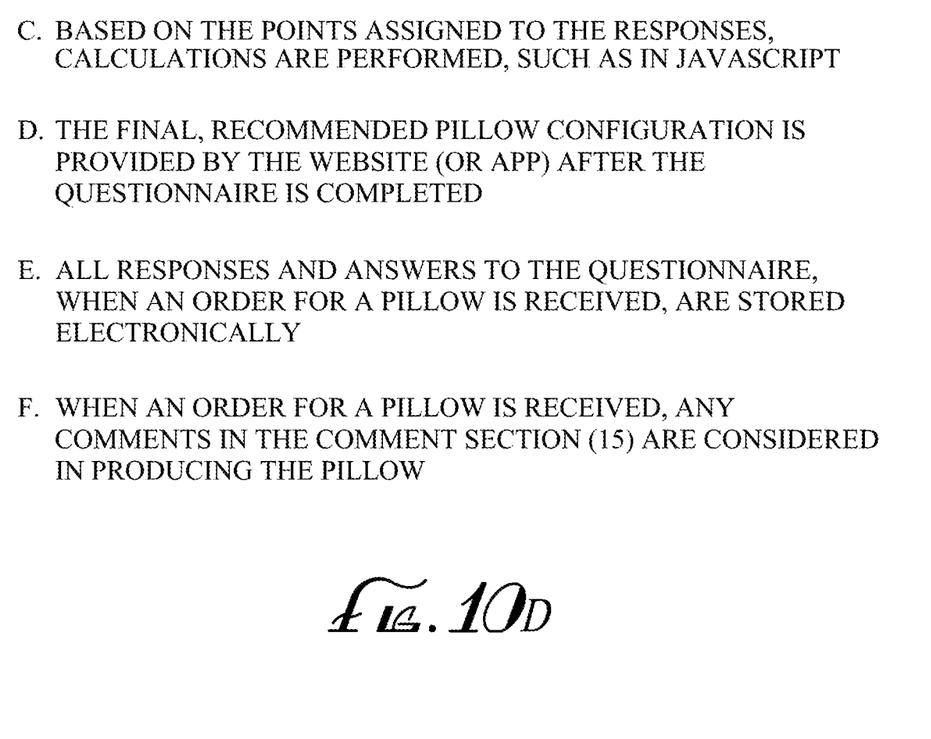

FIG. 9 is a partial cross-sectional view of pillow 20, with part of the top cover 22 and part of bottom cover 24 removed to expose the fill material preferably positioned inside of the top and bottom covers.

Pillow cover 21, including top and bottom covers 22, 24 can be made of any of various, preferred materials, and are preferably of a 2-ply construction, such that pillow cover pockets or chambers 40, 40 are formed within the top and bottom covers, as shown in FIG. 9. Pillow 20 has two preferred embodiments for outside cover 21: one made of a material that provides a cooling function during use and the other made of a material that does not provide such a cooling function. The preferred cover 21 embodiments for pillow 20 are manufactured by, and commercially available from DeLan Home Co., Ltd in Hangzhou China. The covers 21 are available in several configurations, and for the purpose of the present embodiments, all are in standard pillow sizes and with a gusset and available in several configurations. The pillow sizes may vary, such as standard, queen, or king.

The first preferred outside material of the cover 21 has a quilted texture, with typical dimensions of 24"×16"×2", has a weight of 350GSM (Grams per Square Meter), and is referred to Cooling Circular Knit Filled Pillow Jacket. A preferred material is 51.5% Cooling PE (Polyethylene), 48.5% Polyester, with a small diamond circular knit, white in color. The second preferred material for top cover 22 and bottom cover 24 is 300TC (Thread Count) cotton. Cover 21 can be made of other materials and with various other thread counts, so long as the cover functions for its intended purpose(s). Cover 21 may also be of virtually any color and/or configuration. As will be appreciated by those skilled in this field, the gusset 26, together with top and bottom covers 22, 24 provide a chamber for holding or containing the foam core 30, and each of the 2-ply top and bottom overs 22, 24 also provide a chamber, shown as 40, 40 for containing filling, shown at 42, 42.

The foam core and for the top cover 22, bottom cover 24 and gusset 26 provide an advantageous structure for the pillow 20, in that the gusset/side walls of the pillow are of a predetermined height to provide support for a user's head, as compared to a tapered edge pillow where the edges have essentially no significant height to provide support for the user's head.

The filling material is preferably a blown fiber, most preferred is 5-ounce, 100% polyester fibers either 1.5D or 3 D (Denier). In exemplary embodiments, the pillow cover also includes upper inner lining 44 and lower inner lining 46, both of which preferably are 190TC, 100% polyester.

The cover 21 preferably includes an "L" shaped zipper 28 extending along one long side and along one short side of the pillow for easy access to the inside foam core 30, and for enabling the cover 21 to be easily removed, replaced, cared for and washed without the inner foam.

The second preferred cover is made of a traditional cotton material, and provides no such cooling properties as does the first embodiment. The surface of the second preferred embodiment is smooth like a regular pillow, and measures 24.5×16.5×2 inches, although such dimensions may vary. Specifically, the preferred material is 300 thread count (300 TC) filled pillow jacket, 100% cotton, sateen, single insertion, white, with the inner lining made of 190TC, 100% Polyester, plain, white material. The embodiment has a knife edge, overlock inside, with a 2-inch gusset, 2 inner linings, 3 chambers, 2 of which are the outer chambers, and an "L" shaped zipper.

There are different types of fill, with different fiber properties (Denier or "D"). One preferred fill is a 1.5D fill that is relatively thin, to highlight or emphasize the feel of the supportive inside foam. This first preferred fill is a 5 oz, 1.5D blown fiber for the outer and/or inner chambers 40, 40. The second preferred fill is a 5 oz., 3D blown fiber fill that is more voluminous and "poofy" to cover the foam 30 with a more traditional pillow feel. The second, or traditional cotton cover, 300TC pillow cover, is slightly larger because the manufacturing process involved results in the final product having a slightly smaller inside chamber for holding the foam core 30, thus requiring a slightly larger cover to contain the same sized foam core 30. The foams preferably fit essentially perfectly, edge to edge inside each of the pillow covers.

As referred to above, the preferred embodiment pillows have at least 4 different covers, at least 2 different types of fills and fill levels, and at least 3 different types of foams with at least 4 different heights, all of which can be mixed and matched to suit a particular user's preferences and provide a multitude of unique combinations of pillow configurations. As will be described below, matching a particular pillow configuration with a particular user's preference (s) is accomplished by a novel algorithm.

With reference to FIGS. 10, 10A-10D the preferred algorithm involves taking information that a potential user/customer provides on-line (such as through a website or an app) in response to a series of questions related to that person and information that has been discovered to be useful in optimizing pillow characteristics for a particular user. Each answer provides or assigns points to certain qualities of the pillow materials available. At the end of the questionnaire, the materials corresponding to, or with the highest number of points is used to create the configuration optimized for that potential user, based on the information provided by the potential user or potential customer.

With reference to FIGS. 10A-10D, an exemplary set of online questions that form the basis for the algorithm (in bold) and the reasons for or correlation to available pillow materials and configurations are:

(1) Name and age: (To keep the process personal and engaging.)

(2) Height and weight: (Because different body types and weights correlate to different pillow types.)

(3) Email: (To save answers in case the online questionnaire is interrupted.)

(4) Is your current pillow: (To know what type of pillow the potential user/customer is currently using.)
Latex?
Foam?
Fill?
Other/Don't Know?

(5) Would you describe it as: (To determine how soft or firm is the potential user's/customer's current pillow.)
Soft?
Medium?
Firm?

(6) What about its height: (To determine how high or low is the potential user's/customer's current pillow.)
Low?
Medium?
High?

(7) How satisfied are you with it (5 being pretty peachy): (To determine how much does the potential user/customer like her/his current pillow? In other words, should a similar pillow or a completely different pillow be created?)
1-5

(8) Is your current pillow: (This question only appears if the potential user/customer chooses a 3 or lower in question 7, or the question regarding how satisfied the customer is with the current pillow. It asks whether her/his current pillow is too soft or too hard.)
Too hard?
Too soft?
Just right?

(9) Is your current pillow: (This question only appears if she/he chose a 3 or lower in question 7. It asks him/her whether his/her current pillow is too high or too low.)
Too low?
Too high?
Just right?

(10) Does your head get hot at night? (If "yes" is selected here, then the algorithm may skip the next question. "Yes" means that the 350GSM Cooling Circular Knit Filled Pillow Jacket or other similar material is provided/recommended.)
Yes?
No?

(11) Do you prefer a smooth, simple pillow surface or something more quilted & plush? (In other embodiments, this question only appears if the answer "No" is selected in response to question 10.)
Smooth?
Quilted?
No Preference?

(12) What position do you tend to settle in when you go to bed? (Self explanatory.)
Facing up (back)?
Facing down (stomach)?
On your side?

(13) What position do you tend to settle in when you wake up? (Self explanatory.)
Facing up (back)?
Facing down (stomach)?
On your side?

(14) What sounds better? (Would she/he prefer a more traditional plushy feel or a more foam-like supportive feeling in her/his pillow?)
Plush and Melt-in
Settled in and supportive (15) An optional comment section, such as a blank box (Wherein a customer can type in specific comments, such as those that are not covered in the questionnaire, that they would like to be taken into account for their pillow configuration.)

An example of how the weighted system would work is in a situation where the potential user disliked his/her previous pillow for being too low and it was a low pillow to begin with. All of the preferred medium height pillow configurations would provide a 1-point boost. Some of the questions and answers are more heavily weighted than others. For example, an answer stating that the user went into bed on the user's side would correlate or assign a 2-point boost to medium high pillow configurations because it is believed that initial-getting-into-bed-comfort is very important for a good night's sleep.

The answers to some questions affect the points-multiplier of other questions. For example, as shown in FIG. 10C, if a potential user really loved his/her current pillow and chose a "5" in question 7, then more points will be assigned or correlated to the configurations best matching those characteristics. If the answer selected in question 7 was a "1", indicating that the user hated his/her current pillow, then more weight would be assigned to the answers to questions 8 and 9, so that based on those answers, materials would be correlated so that the user would get a pillow that is new and different from his/her current pillow.

As another example, those who answer "plush and melt-in" in question 14 would most likely receive a pillow that has a thick 3D cover with a smaller, relatively thin, such as a 2" or 2.5" foam. Conversely, those who answer "Settled in and supportive" would most likely receive a thinner 1.5D cover and a relatively thick, such as a 3" or 3.5" foam.

Also, the pillows in the middle of the pack have been provided with more opportunities to earn points than pillows with extreme configurations. This means that extreme ends of the spectrum are not selected as often. Like when academic grades for a class test or grade are considered on a bell curve, the pillow selected or resulting from use of the algorithm is such that most people will end up with a configuration that is neither too high or too low, in other words, in a high area of a corresponding bell curve. For example, only those potential users who really answer in an extreme way will get a very low or very high pillow. This system also incorporates a "fail-safe" mechanism such that very unusual or "whacky" answers that do not make sense still produce a configuration that is not very extreme, one way or another.

Also, each configuration is also individually weighted so that in the case of any tie in regard to more than one pillow configuration resulting after initial calculation, the most popular configurations will come out as the recommended pillow.

The present system and algorithm can be revised or adapted to add, remove or change pillow configurations in the future. The algorithm simply would be updated to adjust to where or to what the points corresponding to the answers, on a question-by-question base, would be assigned after each question. The algorithm can also be modified to include additional questions or to remove questions.

The calculations are performed in the backend of the online questionnaire portal, such as in JavaScript on a website application (or app), as will be appreciated by and can be implemented by a person of ordinary skill in this field. No manual work is necessary. While the algorithm is calculated in JavaScript in a preferred embodiment, it may also be done in other programming languages that are available. The final, recommended pillow configuration is provided by the website (or app) after the questionnaire is completed. All responses and answers to the questionnaire, when an order for a pillow is received, are stored electronically.

In another exemplary embodiment, all customer answers (such as during a particular time frame) are translated into a string of numbers and letters (similar to an answer key) that allows identification of orders with similar answers. All customer feedback is also recorded and tied to their answer key. This shows what other customers with the same or similar answers may have liked or disliked with their pillow variation. As more feedback and data points are collected through the system, this data is used to help make improvements to the algorithm, such as reassigning weights given to certain responses, or changing the types of questions asked.

Figure 11:
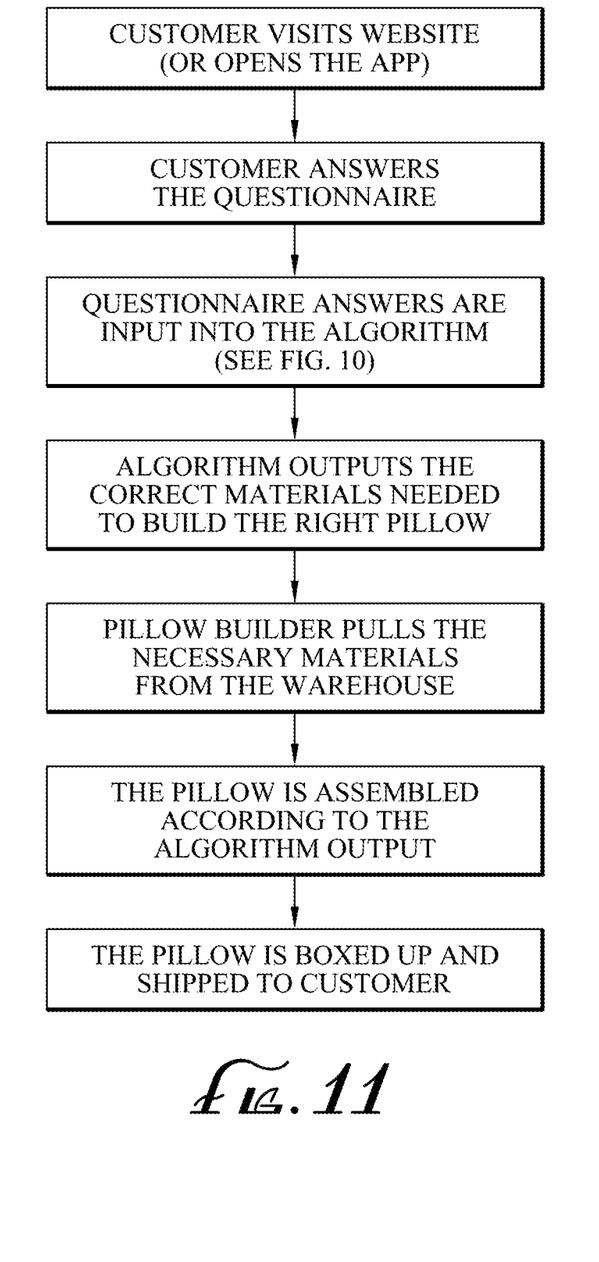

Referring to FIG. 11, the step-by-step pillow ordering process incorporates the algorithm described above. Once the exact pillow configuration is provided by the website though application of the algorithm in response to a customer's answers to the questions, then the chosen/resulting pillow components are taken out from inventory of pillow components, the resulting pillow is assembled, so that the correct foam is placed into the correct cover and the cover is zipped up. The resulting pillow is then complete and ready to be place into a colored display box and then into a shipping box, shipped to the customer, and slept on.

As described above the inventive system and process provides a scientific approach to pillow construction and selection, and breaks down a pillow into different, interchangeable component parts that can be mixed and matched to meet the needs and preferences each user/customer. With the optimum combination of selected, various, interchangeable components that are selected through an algorithm that uses an online, personalized questionnaire to identify an individual's specific needs and preferences, the potential customer/user is ultimately left with a much more engaging and accurate pillow buying experience than is conventionally available.

In summary, there are five main characteristics or basic properties of the presently described custom pillows that can be changed from nominal, default characteristics or varied from pillow to pillow, with the changes or variations based on the responses provided to the questionnaire. In an exemplary embodiment, those five characteristics or properties are:

1. Cover surface material.
2. Properties of blown fibers inside of the cover.
3. The amount of blown fibers inside of the cover.
4. The height of the foam core.
5. The density and make up of the foam core.

Although specific embodiments of the disclosure have been described, various modifications, alterations, alternative constructions, and equivalents are also encompassed within the scope of invention as set forth in the claims.

The specification and drawings are, accordingly, to be regarded in an illustrative rather than a restrictive sense. It will, however, be evident that additions, subtractions, deletions, and other modifications and changes may be made thereunto without departing from the broader spirit and scope of invention as set forth in the claims.

What is claimed is:

1. A method for providing an individual person a custom pillow that includes a cover, blown fibers inside the cover, and a foam core, the method comprising steps of:
   providing a memory and processor wherein the processor is configured to execute a system that evaluates, through a programming language within a website application, data regarding the individual person's current pillow and correlating them with materials to be used for the custom pillow;
   inputting, into the website application, data containing the individual person's weight and height information;
   inputting, into the website application, data containing information regarding the individual person's current pillow;
   inputting, into the website application, the individual person's pillow preferences;
   evaluating, through the website application, the data regarding the individual person's current pillow and instantaneously correlating them with materials to be used for the custom pillow;
   presenting to the individual person the materials correlated by the website application to create the custom pillow that is customized for the individual person;
   wherein the website application comprises a means for executing a weighted system that assigns points to a pillow configuration based on the individual person's responses;
   wherein the weighted system provides a point boost for a medium height pillow configuration if the individual person responded that he/she disliked his/her current pillow for being too low;
   wherein if the individual person responded that he/she is very satisfied with his/her current pillow, the weighted system provides a point boost to the pillow configurations best matching the individual person's current pillow configuration; and,
   wherein if the individual person responded that he/she is not satisfied with his/her current pillow, the weighted system provides a point boost to the pillow configurations that are different from the individual person's current pillow configurations.

2. The method of claim 1 further comprising a step of making changes to the materials correlated by the website application.

3. The method of claim 1 further comprising steps of: obtaining the materials correlated by the website application to create the custom pillow that is customized for the individual person; assembling the materials to create the custom pillow; packaging the custom pillow; and, shipping the custom pillow.

4. The method of claim 1 wherein the individual person's preference for a plush pillow is correlated to a pillow material comprising a thick cover with a thin foam.

5. The method of claim 1 wherein the individual person's preference for a supportive pillow is correlated to a pillow material comprising a thin cover with a thick foam.

6. The method of claim 1 wherein the individual person's preference for a cooling pillow is correlated to a pillow material that has a cooling function.

7. The method of claim 1 wherein the data regarding the individual person's current pillow, the data regarding the individual person's pillow preferences, and the materials correlated to be used for the custom pillow are stored electronically.

8. The method of claim 1 further comprising steps of translating the data regarding the individual person's current pillow and the data regarding the individual person's pillow preferences; identifying similarity or dissimilarity between the data; collecting data points based on the similarity or dissimilarity between the data; and, adjusting the correlation of materials to create the custom pillow that is customized for the individual person.

9. The method of claim 1 wherein the programming language within the website application is JavaScript.

10. A system for creating a custom pillow for an individual person, comprising:
    a memory and processor wherein the processor is configured to execute the system that evaluates, through a programming language within a website application, data regarding the individual person's current pillow and correlating them with materials to be used for the custom pillow;
    inputting, into the website application, data containing a plurality of responses provided by the individual person and storing that data electronically;
    wherein the plurality of responses comprises data relating to the individual person's current pillow, which data comprises pillow configurations relating to the individual person's current pillow and how satisfied the individual person is with the individual person's current pillow;
    means within the website application for assigning points to the plurality of responses relating to the individual person's current pillow;
    means within the website application for adding a multiplier to the points assigned to the plurality of data relating to the individual person's current pillow, wherein the multiplier is weighted;
    means within the website application for evaluating the plurality of data relating to the individual person's current pillow and instantaneously correlating materials based on the weighted multiplier;
    means within the website application for generating a custom pillow configuration based on the plurality of data relating to the individual person's current pillow and based on the weighted multiplier.

11. The system of claim 10 wherein the plurality of data relating to the individual person's current pillow comprises information relating to pillow materials.

12. The system of claim 10 wherein the plurality of data relating to the individual person's current pillow comprises information relating to pillow firmness.

13. The system of claim 10 wherein the plurality of data relating to the individual person's current pillow comprises information relating to pillow height.

14. The system of claim 10 further comprising means for translating the plurality of responses provided by the individual person to data points; means for collecting the data points; and, means for reassigning points given to the user-provided information based on the data points.

15. The system of claim 10 wherein the programming language within the website application is JavaScript.

* * * * *